United States Patent [19]

Rupp

[11] Patent Number: 5,163,244
[45] Date of Patent: Nov. 17, 1992

[54] STRIKING FISHING ROD HOLDER

[76] Inventor: Herbert E. Rupp, 4761 Anchor Ave., Port Salerno, Fla. 33492

[21] Appl. No.: 631,342

[22] Filed: Dec. 20, 1990

[51] Int. Cl.[5] .............................................. A01K 97/10
[52] U.S. Cl. ........................................ 43/21.2; 43/15; 248/514
[58] Field of Search .................... 433/15, 16, 21.2; 248/514, 515

[56] References Cited

U.S. PATENT DOCUMENTS

| | | | |
|---|---|---|---|
| 562,195 | 6/1896 | Plath | 248/514 |
| 2,843,962 | 7/1958 | Porter | 43/15 |
| 3,284,943 | 11/1966 | Wedel | 43/15 |
| 3,777,389 | 12/1973 | DeMino | 43/15 |
| 3,802,112 | 4/1974 | Banner | 43/21.2 |
| 3,881,269 | 5/1975 | Timmons | 248/514 |
| 4,017,998 | 4/1977 | Dumler | 43/21.2 |
| 4,578,891 | 4/1986 | Murray | 43/21.2 |
| 4,778,141 | 10/1988 | Bogar | 43/21.2 |
| 4,887,375 | 12/1989 | Shedd | 43/21.2 |
| 5,065,540 | 11/1991 | Potter, Jr. | 43/21.2 |
| 5,070,638 | 12/1991 | Tregaskis | 43/21.2 |

Primary Examiner—Kurt C. Rowan
Attorney, Agent, or Firm—Carroll F. Palmer

[57] ABSTRACT

An improved striking fishing rod holder for permanent installation on the cockpit gunnel or other location of a fishing boat is disclosed that enables hook-setting movement of the rod upon a fish strike of the bait trolled from the rod without removal of the rod from the holder. The new holders include a mounting plate assembly, a depending tubular member hinged to the plate assembly that swings from a troll position to a hit position and a detent assembly to releasably hold the tubular member alternatively in the troll or hit position. Advantageously, the holder also has an adjustment unit to vary the force required to override the detent assembly to release the tubular member for movement between its troll and hit positions. When a fish hits the bait being trolled from the rod held in the improved holder, movement of the rod in the new holder from the troll position to the hit position, alerts the fisherman that a fish strike has been made.

19 Claims, 3 Drawing Sheets

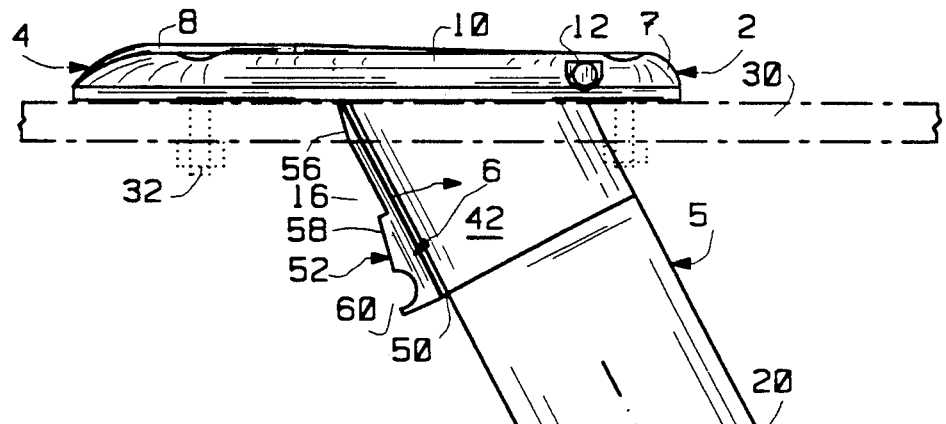
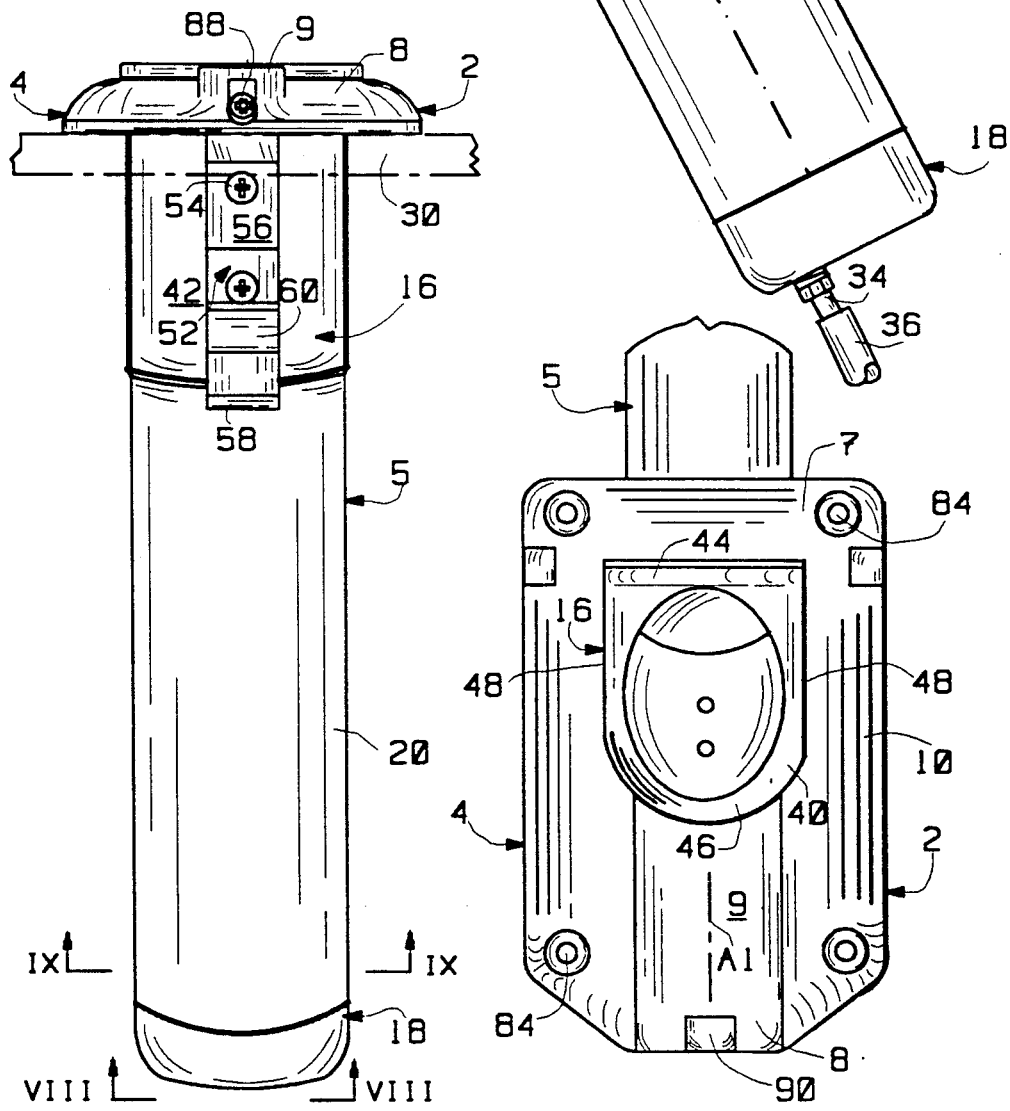

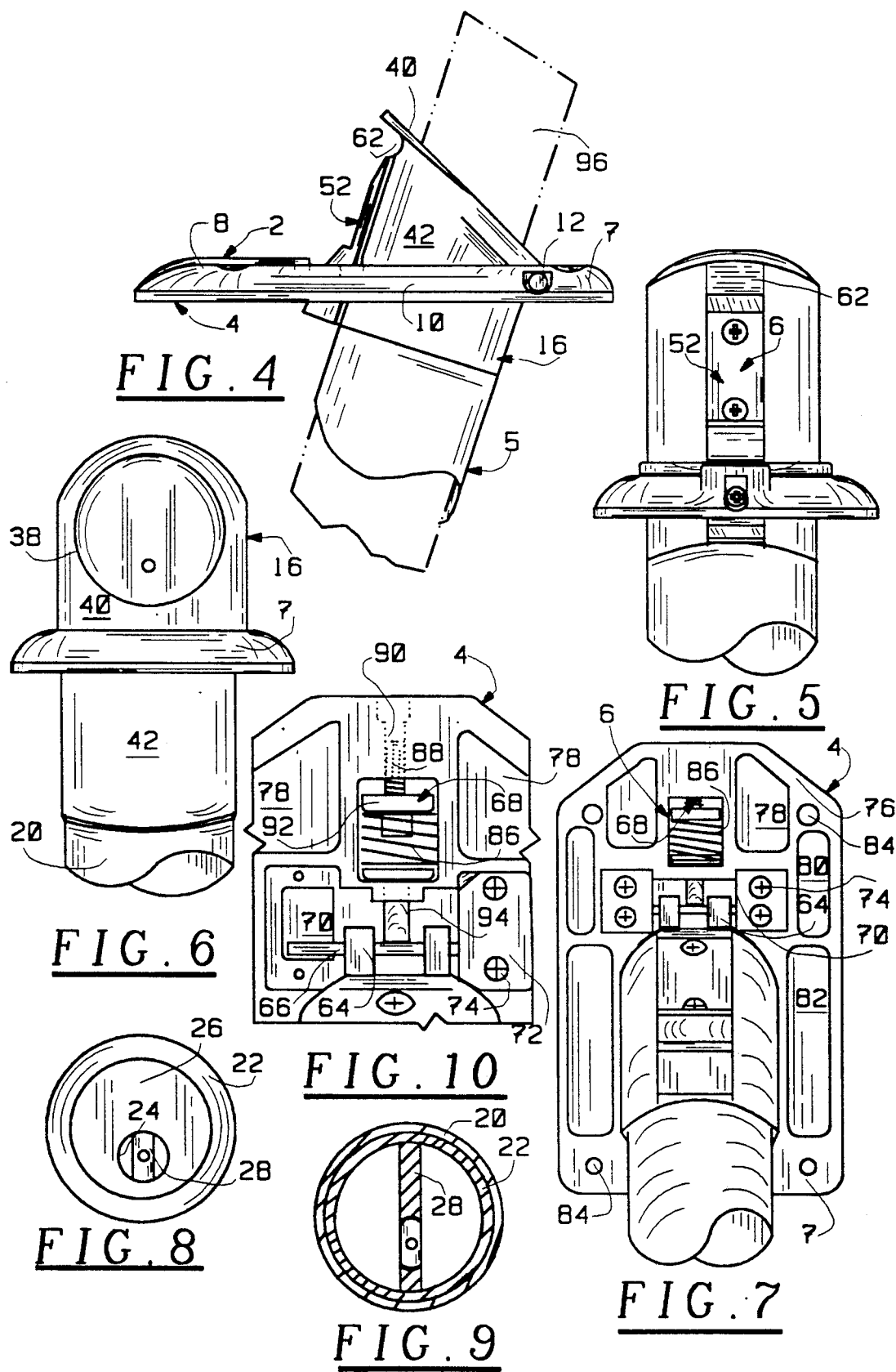

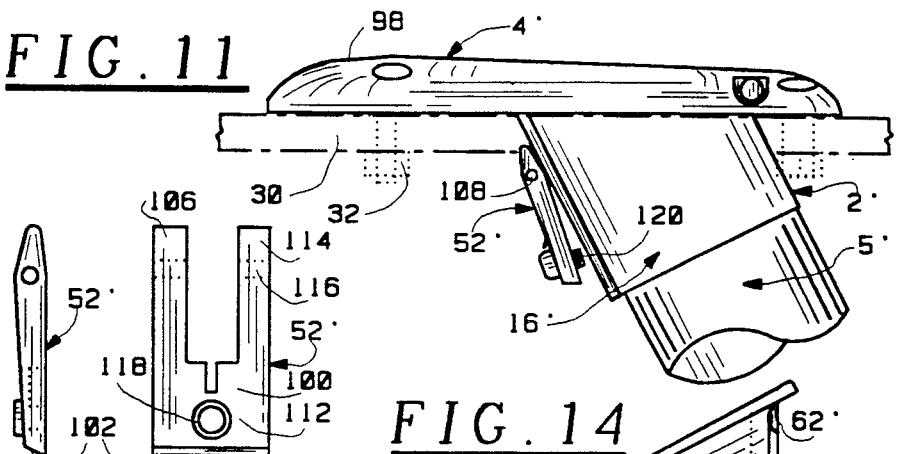
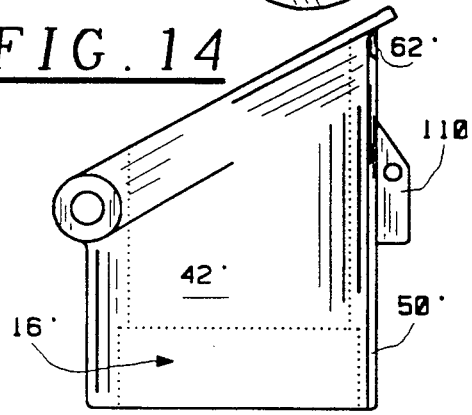
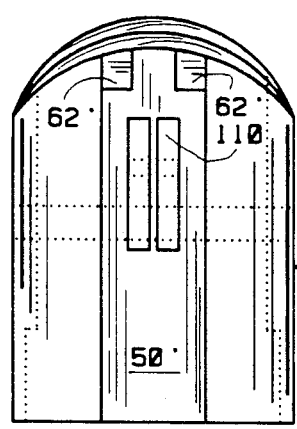
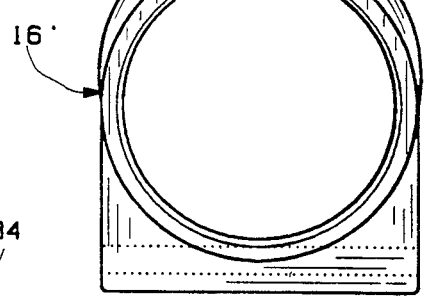
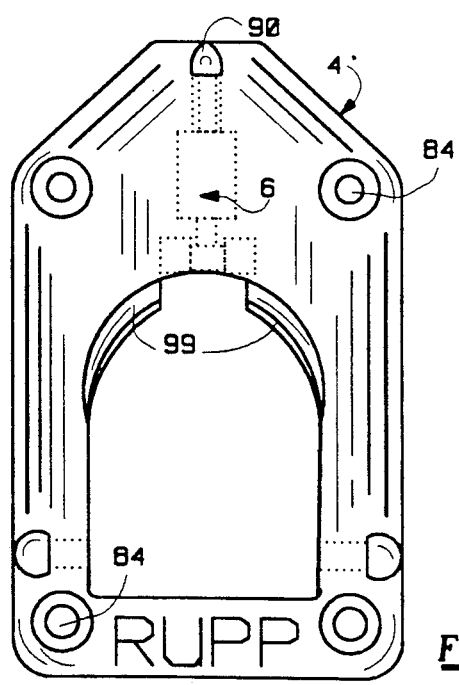
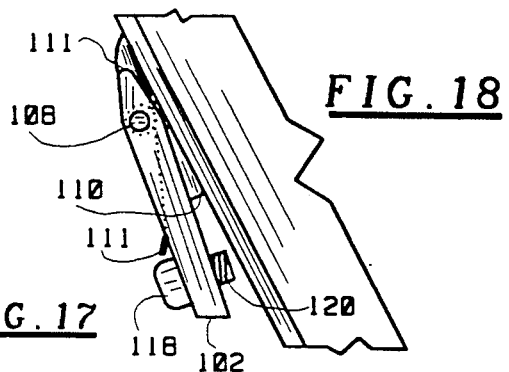

STRIKING FISHING ROD HOLDER

BACKGROUND OF THE INVENTION

1. Field of the Invention

This application relates to fishing rod holders. More particularly, it concerns fishing rod holders which are permanently installed on fishing boats that permit the rod to be moved to set the hook without need to remove the rod from the holder when a fish strikes the bait.

2. Description of the Prior Art

Conventionally, sportfishing boats are equipped with permanently installed fishing rod holders that enable rods to be held in an angled or upright position while lines are trolled from them behind the boat. This relieves the fisherman from continually holding the rod while awaiting some action from the fish. Typically, such rod holders comprise a plate mounted on a gunnel or other portion of the boat from which a tube depends and the handle portion of the rod is inserted through a hole in the plate into the tube.

In such prior known rod holders, the dependent tube is fixed at a suitable angle relative to the mounting plate so the rod being held is angled toward the stern of the boat. Such rod holders do not permit the rod to be moved to set the hook in a fish that strikes the bait being trolled from the rod. Thus, with such rod holders, the fisherman must remove the rod from the holder to set the hook or play the fish. The loss of time caused by removal of the rod from the holder frequently results in failure to set the hook and loss of the fish.

Several types of modified rod holders have been devised to overcome the fixed position problem mentioned above, so-called striking rod holders. For example, see U.S. Pat. Nos. 4,495,721 (Emory), 4,578,891 (Murray) and 4,614,323 (Bauer). The Murray holder requires a large opening for movement of the fishing rod and, accordingly, is undesirable for mounting in the gunnel of sportfishing boats. Likewise, the Emory and Bauer holders are unsuitable for gunnel mounting since they have protruding tube members that constitute a hazard to fisherman occupying the cockpit area of the fishing boat, particularly when boat is running in rough seas and not engaged in fishing.

Additional fishing rod holders that permit the rod to be moved without being removed from the holder are known, e.g., see U.S. Pat. Nos. 2,548,328 and 3,126,180. However, the rod holders of these patents are not designed for gunnel or like mounting on sportfishing boats.

The present invention addresses the defects in prior known striking fishing rod holders and provides improved holders of such type.

OBJECTS

A principal object of the invention is the provision of improved striking fishing rod holders.

Another object is the provision of such rod holders that can be permanently mounted in the gunnel or like portion of a sportfishing boat to permit a fisherman operating in the cockpit of the boat to move the rod so as to set the hook in the fish as soon as the trolled bait is hit by a fish without need to remove the rod from the holder.

A further object is the provision of such rod holders that stow the fishing rod at a forward angle from which it snaps to a rearward angle when an adjustable amount of tension is applied to the fishing line by a fish hitting the bait being trolled from the fishing rod thereby notifying the fisherman that a fish has struck the bait.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The objects are accomplished in accordance with the invention by the provision of striking fishing rod holders that basically comprises a mounting plate assembly, a tubular member that depends from and detent means to releasably hold the tubular member alternatively in a troll position and in a hit position. The tubular member is pivoted on the fore portion of the plate assembly to swing between the troll position and the hit position.

The plate assembly is defined by a fore portion, an aft portion and a central portion all lying in a first plane along a first longitudinal axis.

The tubular member comprises a rod entrance unit, a bottom unit and a central tube joining the entrance unit to the bottom unit along a second longitudinal axis.

The bottom unit includes a ledged cup welded to the central tube and, preferably, the cup has a threaded drain hole in the base thereof.

The entrance unit includes a rod entrance face portion having an elliptical opening therein located in a plane positioned at an acute angle to the aforesaid second longitudinal axis and a tubular portion that depends integrally from the face portion concentric with the second longitudinal axis. Its face portion is defined by a straight fore end, an arcuate aft end and a pair of parallel sides. The straight fore end carries a pin by which the entrance unit is pivoted to the plate assembly.

The tubular portion of the entrance unit includes an integral rectangular ledge whose major axis parallels the second longitudinal axis and the ledge carries a pivot lug.

The detent means comprises a pair of rollers carried in the mounting plate assembly on an axle positioned transverse to the first longitudinal axis and adjustment means to vary the force required to override the detent means to release the tubular member therefrom for movement between the troll and the hit positions. There are arcuate recesses in the tubular member to engage the rollers when the tubular member enters the hit position.

The axle is carried by and slides in a pair of longitudinal slots formed in the plate assembly for reciprocation along the first longitudinal axis in a third plane parallel to the first plane. The slots are defined in part by covers held onto the plate assembly by fasteners. Spring means that biases the rollers toward the fore portion of the plate assembly comprises a coil spring and the aforesaid adjustment means includes screw means to adjust the amount of bias force applied by the spring means to the rollers.

A latch unit is carried on the tubular member to engage the rollers when the tubular member enters the troll position. Such latch unit comprises, in a preferred embodiment, a web defined, in part, by a transverse ledge that engages the rollers when the tubular member enters the troll position and a pivoted end opposite to the transverse ledge that pivots on a pin carried by a lug that extends laterally from the tubular member. A spring biases the transverse ledge away from the tubular member.

The latch unit has a "U" shape, the base thereof being defined by the transverse ledge and the legs of the "U" shape have bores therein to receive a pivot pin. The web further including a threaded bore adjacent the transverse ledge to receive an adjustment screw that limits the approach of the transverse ledge to the tubular member.

A modified latch unit is employed in another embodiment of the new rod holders. In either embodiment, adjustment can be made that will control the amount of force that must be applied to the fishing line and, in turn, to the fishing pole in order unlatch the rod holder from the troll position and allow it to move to the hit position. This allows the fisherman to vary the "alarm" feature of the new rod holders to suit the size of fish he seeks to catch, the size of the bait being trolled, the sea conditions, etc.

In use of the new rod holders, the rod handle is inserted into the holder through the elliptical opening in the entrance unit and the tubular member is cocked into the troll position whereby the rod angles toward the bow of the trolling boat. The baited fishing line trails from the raised tip of the fishing rod aft of the stern of the boat. When a fish strikes the bait, the restraining force of the detent means is overcome so the rod will snap into the hit position thereby alerting the fisherman to fact that he has a fish strike. Then, without need to remove the rod from the improved holder, he can immediately jerk the rod forward to set the hook in the fish.

BRIEF DESCRIPTION OF THE DRAWINGS

A more complete understanding of the invention can be obtained by reference to the accompanying drawings in which:

FIG. 1 is a lateral view of a first embodiment of the improved striking fishing rod holder of the invention with the tubular member thereof in the hit position.

FIG. 2 is an aft view of the rod holder of FIG. 1.

FIG. 3 is a fragmentary plan view of the rod holder of FIG. 1.

FIG. 4 is a fragmentary lateral view of the rod holder of FIG. 1 with the tubular member thereof in the troll position.

FIG. 5 is a fragmentary aft view corresponding to FIG. 4.

FIG. 6 is a fragmentary fore view corresponding to FIG. 4.

FIG. 7 is a fragmentary bottom view corresponding to FIG. 1.

FIG. 8 is a plan view taken on the line VIII—VIII of FIG. 1.

FIG. 9 is a sectional view taken on the line IX—IX of FIG. 1.

FIG. 10 is an enlarged, fragmentary view of the spring means and part of the detent means of the new rod holders.

FIG. 11 is a fragmentary lateral view of a second embodiment of the improved rod holder of the invention with the tubular member thereof in the hit position.

FIG. 12 is a lateral view of a latch element of the rod holder shown in FIG. 11.

FIG. 13 is a plan view of the latch element.

FIG. 14 is a lateral view of the entrance unit of the rod holder shown in FIG. 11.

FIG. 15 is an aft view of the entrance unit of FIG. 14.

FIG. 16 is a plan view of the entrance unit of FIG. 14.

FIG. 17 is a plan view of the plate assembly of the rod holder of FIG. 11.

FIG. 18 is an enlarged, fragmentary, lateral view of the latch unit of the rod holder of FIG. 11.

DESCRIPTION OF THE PREFERRED EMBODIMENTS

Referring in detail to FIGS. 1-10 of the drawings, a first embodiment of the new striking fishing rod holder 2 basically includes a mounting plate assembly 4, a tubular member 5 and detent means 6.

The mounting plate assembly 4 is defined by a fore portion 7, an aft portion 8 with a longitudinal ridge 9 and a central portion 10, all lying in a first plane along a first longitudinal axis A1.

The tubular member 5 which depends from the plate assembly 4 is hinged by pin 12 on the fore portion 7 to swing from a troll position as shown in FIG. 4 to a hit position as shown in FIG. 1.

The tubular member 5 comprises a rod entrance unit 16, a bottom unit 18 and a central tube 20 joined along a second longitudinal axis A2.

The bottom unit 18 is a ledged cup 22 welded to the central tube 20. The cup 22 has a threaded drain hole 24 in its base 26 and a transverse reinforcement web 28. When the holder 2 is installed in the gunnel 30 surrounding the cockpit of a sportfishing boat with fasteners 32, the boat owner may fit a threaded coupling 34 into the hole 24 and attach flexible tubing 36 to drain water that enters the tubular member 12 into a bulge (not shown) or overboard.

The rod entrance unit 16 has an elliptical opening 38 in its entrance face portion 40 and a tubular portion 42 that depends integrally from the face portion 40. The face portion 40 has a straight fore end 44, an arcuate aft end 46 and a pair of parallel sides 48. The fore end 44 carries the pin 14 by which the entrance unit 40 is pivoted to the plate assembly 4.

The tubular portion 42 of the entrance unit 16 has an integral rectangular ledge 50 whose major axis parallels the second longitudinal axis A2 and a latch member 52 is fixed thereto by screws 54.

The latch member 52 comprises a tongue portion 56 and a wedge portion 58, the latter having an arcuate recess 60 therein. Above the latch member (see FIG. 4), the tubular portion 42 has a similar arcuate recess 62. These recesses function as part of the detent means 6 to hold the tubular member 12 alternatively in its troll position (FIG. 4) and its hit position (FIG. 1) as described below.

The detent means 6 comprises a pair of rollers 64 carried in the mounting plate assembly 4 on an axle 66 positioned transverse to the first longitudinal axis and adjustment means 68 to vary the force required to override the detent means 6 to release the tubular member 5 therefrom for movement between the troll and the hit positions.

The axle 66 is carried by and slides in a pair of longitudinal slots 70 formed in the plate assembly 4. The slots 70 slots are in part defined by covers 72 held on the plate assembly 4 by fasteners 74. (The left hand cover 72 has been removed in FIG. 10 for the purpose of illustration of parts of the detent means 6).

As seen in FIGS. 7 and 10, the undersurface 76 of the plate assembly 4 has a plurality of material-saving recesses 78, 80 and 82 therein and bores 84 to receive fasteners 32.

Coil spring 86 biases the rollers 64 toward the fore portion 7 of the plate assembly 4 and adjustment means 68 varies the amount of bias force applied by the spring 86 to the rollers 64. Such means 68 includes an Alan screw 88 threaded into the bore 90, a first plunger 92 and second plunger 94.

In use of the new rod holders, a rod handle 96 is inserted into the holder 2 through the elliptical opening 38 in the entrance unit 16 and the tubular member 5 is cocked into the troll position (FIG. 4) whereby the rod angles toward the bow of the trolling boat. When a fish strikes the bait, the restraining force of the detent means 6 is overcome so the rollers move out of the recess 58 to let the rod 96 snap into the hit position (FIG. 1) thereby alerting the fisherman to fact that he has a fish strike. Then, without need to remove the rod from the improved holder 2, he can immediately jerk the rod forward to set the hook in the fish. Further, he can move the rod between the troll and hit positions to "play" the fish, also without taking the rod 96 out of the holder 2.

The second embodiment of the rod holder 2' involves changes, as compared to holder 2, in the mounting plate assembly 4', a tubular member 5' detent means 6', entrance unit 16' and latch unit 52'.

The plate assembly 4' has a flush top surface 98, unlike assembly 4 with its longitudinal ridge 9. Also, assembly 4' has ledge portions 99 that seats the entrance unit 16' differently than assembly 4 seats entrance unit 16.

The entrance unit 16' carries an integral longitudinal ledge 50' on tubular section 42', but the attachment of latch unit 52' is unlike that of unit 52 in holder 2.

The latch unit 52' which engages the rollers 64 when the tubular member 5' enters the troll position (not show, but see FIG. 4), comprises a web 100 defined, in part, by a transverse ledge 102 that engages the rollers 64 and an opposed end 106 pivoted on pin 108 carried by a lug member 110 that extends laterally from the entrance unit 16'. A spring 111 biases the transverse ledge 102 away from the entrance unit 16'.

It will be apparent that the ledge 102 in holder 2' functions like the recess 60 in holder 2 and that the entrance unit 16' has a pair of arcuate recesses 62', rather than a single one like recess 62 of holder 2, to engage the rollers 64 to releasably hold the tubular member 5' in the hit position.

The latch unit 52' has a "U" shape, the base 112 thereof being defined by the transverse ledge 102 and the legs 114 of the "U" shape have bores 116 therein to receive the pivot pin 108. The web 100 further includes a threaded bore 118 to receive an adjustment screw 120 that limits the approach of the transverse ledge 102 toward the tubular member 5'.

One difference between holder 2 and holder 2' is that holder 2' permits closer control on the adjustment of the force required to unlatch the tubular member 5' from its troll position to permit to move toward the hit position. The "fine tuning" for such adjustment resides in the provision of the transverse ledge 102 whose position relative to the axis of rotation of rollers 64 can be adjusted by movement of the screw 120. Thus, the lower the top edge of ledge 102 is positioned when the rollers 64 engage the ledge 102, the lower the force required to disengage the rollers 64. Conversely, if the top edge of ledge 102 above the roller axis of rotation, the tubular member 5' will not unlatch regardless of the amount of force applied to a fishing rod held in the holder 2'.

It has been found, the transverse ledge feature of holder 2' not only suppliments the adjustments that can be made with the adjustment means 68, but provides critical improvement in controlling the force required to unlatch the The embodiments of the invention in which an exclusive property or privilege is claimed are defined as follows:

1. A striking fishing rod holder comprising:
   a mounting plate assembly defined by a fore portion, an aft portion and a central portion all lying in a first plane along a first longitudinal axis,
   a pendant tubular member defined in part by a top end portion containing the opening into which a fishing rod is inserted in use of said rod holder, said tubular member being hinged at said top end portion to said fore portion to swing from a troll position to a hit position in a second plane that includes said first longitudinal axis and is normal to said first plane,
   detent means to releasably hold said tubular member alternatively in said troll position and in said hit position comprising at least one roller carried in said mounting plate assembly for reciprocation along said first longitudinal axis in a third plane parallel to said first plane, and
   adjustment means to vary the force required to override said detent means to release said tubular member therefrom for movement between said troll and said hit positions.

2. The rod holder of claim 1 wherein detent means comprises a pair of said rollers and spring means that biases said rollers toward said fore portion of said plate assembly.

3. The rod holder of claim 2 wherein said pair of rollers are carried on an axle positioned transverse to said first longitudinal axis and said axle is carried by and slides in a pair of longitudinal slots formed in said plate assembly.

4. The rod holder of claim 3 wherein said slots are defined in part by covers held onto said plate assembly by fasteners.

5. The rod holder of claim 1 wherein said detent means comprises an arcuate recess in said tubular member to engage said roller when said tubular member enters said hit position.

6. The rod holder of claim 1 wherein said detent means comprises a latch unit carried on said tubular member to engage said roller when said tubular member enters said troll position.

7. The rod holder of claim 6 wherein said latch unit comprises a web defined, in part, by a transverse ledge that engages said roller when said tubular member enters said troll position and a pivoted end opposite to said transverse ledge.

8. The rod holder of claim 7 wherein said pivoted end pivots on a pin carried by a lug that extends laterally from said tubular member and said latch unit includes a spring that biases said transverse ledge away from said tubular member.

9. The rod holder of claim 1 wherein said tubular member comprises a rod entrance unit, a bottom unit and a central tube joining said entrance unit to said bottom unit along a second longitudinal axis.

10. The rod holder of claim 9 wherein said entrance unit includes a rod entrance face portion having an elliptical opening therein located in a plane positioned at an acute angle to said second longitudinal axis and a tubular portion that depends integrally from said face portion concentric with said second longitudinal axis.

11. The rod holder of claim 10 wherein said face portion is defined by a straight fore end, an arcuate aft end and a pair of parallel sides.

12. The rod holder of claim 11 wherein said straight fore end carries a pin by which said entrance unit is pivoted to said plate assembly.

13. The rod holder of claim 12 wherein said tubular portion of said entrance unit includes an integral rectangular ledge whose major axis parallels said second longitudinal axis and said ledge carries a pivot lug.

14. The rod holder of claim 2 wherein said spring means comprises a coil spring and screw means to adjust the amount of bias force applied by said spring means to said rollers.

15. The rod holder of claim 9 wherein said bottom unit includes a ledged cup welded to said central tube and said cup has a threaded drain hole in the base thereof.

16. The rod holder of claim 7 wherein said web of said latch unit has a "U" shape, the base thereof being defined by said transverse ledge and the legs thereof having bores therein to receive a pivot pin, said web further including a threaded bore adjacent said transverse ledge to receive an adjustment screw that limits the approach of said transverse ledge to said tubular member.

17. A striking fishing rod holder comprising:
- a mounting plate assembly defined by a fore portion, an aft portion and a central portion all lying in a first plane along a first longitudinal axis,
- a tubular member that depends from said plate assembly, said tubular member being hinged to said fore portion to swing from a troll position to a hit position in a second plane normal to said first plane that includes said first longitudinal axis,
- said tubular member comprising a rod entrance unit, a bottom unit and a central tube joining said entrance unit to said bottom unit along a second longitudinal axis,
- said bottom unit including a ledged cup welded to said central tube, said cup having a threaded drain hole in the base thereof,
- said entrance unit including a rod entrance face portion having an elliptical opening therein located in a plane positioned at an acute angle to said second longitudinal axis and a tubular portion that depends integrally from said face portion concentric with said second longitudinal axis,
- said face portion being defined by a straight fore end, an arcuate aft end and a pair of parallel sides,
- said straight fore end carrying a pin by which said entrance unit is pivoted to said plate assembly,
- said tubular portion of said entrance unit including an integral rectangular ledge whose major axis parallels said second longitudinal axis and said ledge carries a pivot lug,
- detent means to releasably hold said tubular member alternatively in said troll position and in said hit position and permit said tubular member when released therefrom to swing freely between said troll and said hit positions,
- said detent means comprising a pair of rollers carried in said mounting plate assembly on an axle positioned transverse to said first longitudinal axis,
- adjustment means to vary the force required to override the detent means to release said tubular member therefrom for movement between said troll and said hit positions,
- arcuate recesses in said tubular member to engage said rollers when said tubular member enters said hit position,
- said axle being carried by and sliding in a pair of longitudinal slots formed in said plate assembly for reciprocation along said first longitudinal axis in a third plane parallel to said first plane,
- said slots being defined in part by covers held onto said plate assembly by fasteners,
- spring means that biases said rollers toward said fore portion of said plate assembly comprising a coil spring and screw means to adjust the amount of bias force applied by said spring means to said rollers,
- a latch unit carried on said tubular member to engage said rollers when said tubular member enters said troll position,
- said latch unit comprising a web defined, in part, by a transverse ledge that engages said rollers when said tubular member enters said troll position and a pivoted end opposite to said transverse ledge, said pivoted end pivoting on a pin carried by a lug that extends laterally from said tubular member and a spring that biases said transverse ledge away from said tubular member,
- said latch unit having a "U" shape, the base thereof being defined by said transverse ledge and the legs of said "U" shape having bores therein to receive a pivot pin, and
- said web further including a threaded bore adjacent said transverse ledge to receive an adjustment screw that limits the approach of said transverse ledge to said tubular member.

18. A striking fishing rod holder comprising:
- a tubular member defined in part by an top end portion containing the opening into which a fishing rod is inserted in use of said rod holder and a bottom end portion, said tubular member being hinged at said top end portion to swing from a troll position to a hit position in a vertical plane,
- detent means to releasably hold said tubular member in said troll position comprising a roller and
- adjustment means to vary the force required to override said detent means to release said tubular member therefrom for movement from said troll position toward said hit position, said adjustment means including a transverse ledge which said roller engages when said tubular member is in said troll position.

19. The rod holder of claim 18 wherein said transverse ledge is part of a lever that is hinged to said tubular member and said lever includes means to vary the position of said ledge relative to the center line of said roller when said roller engages said ledge.

* * * * *